United States Patent

Strik

Patent Number: 5,847,684
Date of Patent: Dec. 8, 1998

[54] DISPLAY DEVICE WITH MIRROR-SYMMETRICAL PIXELS

[75] Inventor: Wilhelmus J. A. Strik, Eindhoven, Netherlands

[73] Assignee: U.S. Philips Corporation, New York, N.Y.

[21] Appl. No.: 23,665

[22] Filed: Feb. 26, 1993

[30] Foreign Application Priority Data

Feb. 27, 1992 [EP] European Pat. Off. ............. 92200567

[51] Int. Cl.⁶ ................................................. G09G 3/20
[52] U.S. Cl. .................................. 345/58; 345/55; 345/91
[58] Field of Search .......................... 340/748; 359/58, 359/59, 60, 61; 345/55, 58, 87, 91

[56] References Cited

U.S. PATENT DOCUMENTS

| | | | |
|---|---|---|---|
| 4,812,017 | 3/1989 | Piper | 359/58 |
| 4,890,097 | 12/1989 | Yamashita et al. | 359/59 |
| 5,032,831 | 7/1991 | Kuijk | 359/60 |
| 5,144,288 | 9/1992 | Hamada et al. | 360/784 |

*Primary Examiner*—Kee M. Tung
*Assistant Examiner*—Matthew Luu
*Attorney, Agent, or Firm*—John C. Fox

[57] ABSTRACT

In a display device of the reset type, drive asymmetries in mutually offset picture electrodes (6) occur due to capacitive crosstalk differences between these picture electrodes (6) and column electrodes, and consequently lead to artifacts.

These crosstalk differences are eliminated by choosing a layout for a picture electrode (6) and the surrounding electrodes (8, 18) and switching elements (9, 19), which layout, viewed in consecutive rows, is mirror-symmetrical.

5 Claims, 3 Drawing Sheets

DISPLAY DEVICE WITH MIRROR-SYMMETRICAL PIXELS

BACKGROUND OF THE INVENTION

The invention relates to a display device comprising an electro-optical display medium between two supporting plates, a system of pixels arranged in rows and columns, with each pixel being formed by picture electrodes arranged on the facing surfaces of the supporting plates, and a system of row and column electrodes for presenting selection and data signals, a picture electrode on one of the supporting plates being connected in an electrically conducting manner to a first switching unit between a column electrode for data signals and the picture electrode and to a second switching unit between the picture electrode and an electrode for a reference voltage.

A display device of this type is suitable for displaying video information and alpha-numerical information by means of passive electro-optical display media such as liquid crystals, electrophoretic suspensions and electrochromic materials.

As used herein, the term "switching unit" is understood to mean a single switching element such as, for example a diode, as well as a combination of such switching elements which are then arranged, for example in series and/or parallel.

An auxiliary voltage beyond or on the limit of the voltage range to be used for picture display may be applied across the pixels (prior to selection) via the electrode for the reference voltage.

A display device of the type described in the opening paragraph is known from U.S. Pat. No. 5,032,831, in which diodes are described as being used as switching elements. Two juxtaposed columns of pixels are connected via these diodes to an intermediate electrode for a reference voltage, while the column electrodes are pairwise arranged between two columns of picture electrodes, and are offset by the width of a column with respect to the electrode for the reference voltage.

To enhance the resolving power, it is known to offset the picture electrodes in consecutive rows with respect to each other by half a period, notably in colour display devices. A column electrode driving picture electrodes within the same column then acquires a meandering path. Due to this meandering path the column electrode in the one row adjoins the picture electrode over a shorter distance (for example, only along one side) than in the next row (where the column electrode also adjoins, for example, parts of contiguous sides). This inequality in the position of the column electrode with respect to picture electrodes in different rows results in a capacitive crosstalk difference between the column electrodes and the different types of picture electrodes. This capacitive cross talk difference results in an unequal drive, which leads to artifacts.

In the above-mentioned division (apart from the space occupied by the switching elements) space is alternately left open for one reference electrode and for two column electrodes, respectively, between successive columns of picture electrodes. This division with a spatial frequency of two rows of columns has an unfavourable influence on the picture display due to the occurrence of a second type of artifacts. This can be obviated by providing a black mask having opaque strips of equal width. As this width is determined by the largest distance which is to be covered (in this case the space required for two column electrodes), these strips needlessly cover parts of picture electrodes at other areas.

Moreover, it is often desired to provide opaque material at the area of the diodes. These diodes are usually manufactured of amorphous silicon which has a larger leakage current under the influence of light. As a result, a further part of the surface of the display device may be lost for picture display.

OBJECTS AND SUMMARY OF THE INVENTION

It is, inter alia, an object of the invention to provide a display device of the type described in the opening paragraph in which these drawbacks are substantially obviated and in which the surface area of the display device is optimally used for picture display.

To this end a display device according to the invention is characterized in that the pixels in consecutive rows are offset with respect to each other in the row direction by a distance covering half a pixel, and in that the patterns of switching units, picture electrodes, column electrodes and electrodes for the reference voltage are arranged substantially mirror-symmetrically with respect to a direction transverse to the row direction for pixels associated with consecutive rows.

In this connection "substantially mirror-symmetrically" is understood to mean that there is no mathematical symmetry, but that small deviations due to process control tolerances are possible, while deviations may also occur at the edges of the system of pixels.

Since the distances adjacent which the column electrodes extend along the picture electrodes in different rows are now substantially equal, there is no longer any difference in capacitive crosstalk between picture electrodes in different rows.

The spaces between the picture electrodes now also have a substantially equal width, so that a black mask can be used which does not needlessly cover parts of picture electrodes.

A first embodiment of a device according to the invention is characterized in that said pattern of switching units, picture electrodes, column electrodes and electrodes for the reference voltage is substantially hexagonal, with two sides of a central part of the hexagon being transverse to the row direction. This embodiment has the additional advantage that the column electrodes and the electrodes for the reference voltage will not be right-angled so that the risk of interruptions is reduced. The switching elements usually have such a small dimension that they can be realised in the narrower parts (located outside the central part) of the hexagon. Opaque material which may be present thus hardly reduces the effective surface area.

A preferred embodiment of a device according to the invention is characterized in that the picture electrodes comprise two sub-electrodes between which the switching elements are arranged. This embodiment has the additional advantage that a given redundance is built in; if the connection with one of the two sub-electrodes is interrupted, the other will continue functioning.

The picture electrodes are preferably divided in such a way that, viewed transversely to the row direction, they are divided into two substantially equal parts. This prevents artifacts from occurring transversely to the row direction due to an unequal division in pictures obtained by means of such a display device.

BRIEF DESCRIPTION OF THE DRAWINGS

These other aspects of the invention will be apparent from and the embodiments described hereinafter and eluciated with reference to the drawings, in which:

FIG. 3 is a diagrammatic cross-section taken on the line III—III in FIG. 2, while

The Figures are not to scale; corresponding components are generally denoted by the same reference numerals.

DESCRIPTION OF THE PREFERRED EMBODIMENTS

Figure 1:
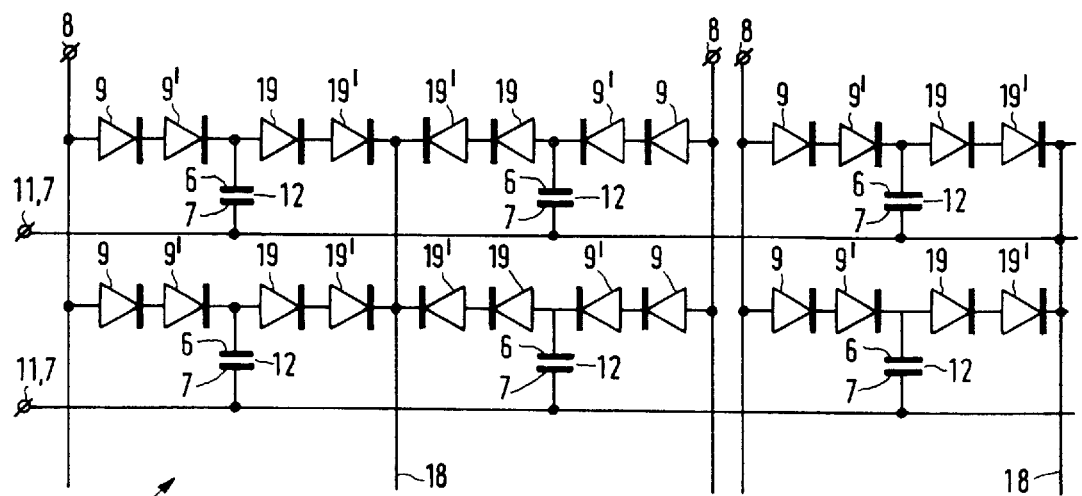
FIG. 1 shows diagrammatically a display device according to the invention.

FIG. 1 shows diagrammatically a display device 1 comprising pixels 12 which are formed by picture electrodes 6, 7 facing each other. The pixels 12 are connected via the picture electrodes 7 to row electrodes 11 which together with the column electrodes 8 are arranged in the form of a matrix. The pixels 12 are connected to the column electrodes 8 via switching units consisting of diodes 9, 9'. Simultaneously they are connected to an auxiliary electrode 18 for a reference voltage via switching units consisting of diodes 19, 19'. For a description of the operation of such a device comprising switching units which consist of several diodes reference is made to U.S. Pat. No. 5,032,831 which is herein incorporated by reference.

Figure 3:
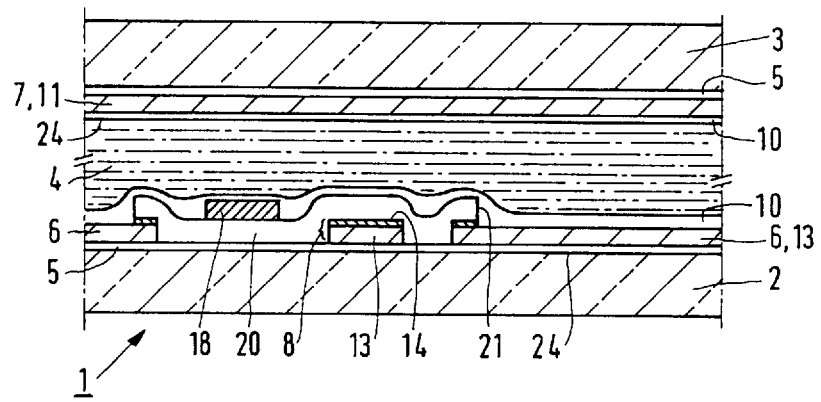
Figure 4:
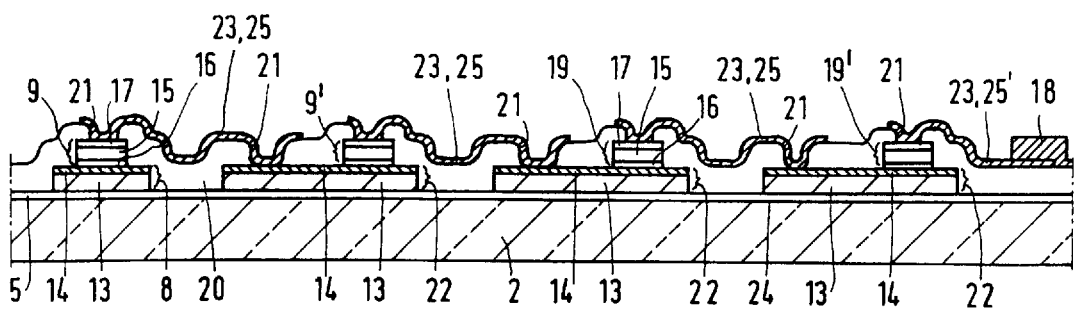
FIG. 4 is a diagrammatic cross-section taken on the line IV—IV in FIG. 2
Figure 2:
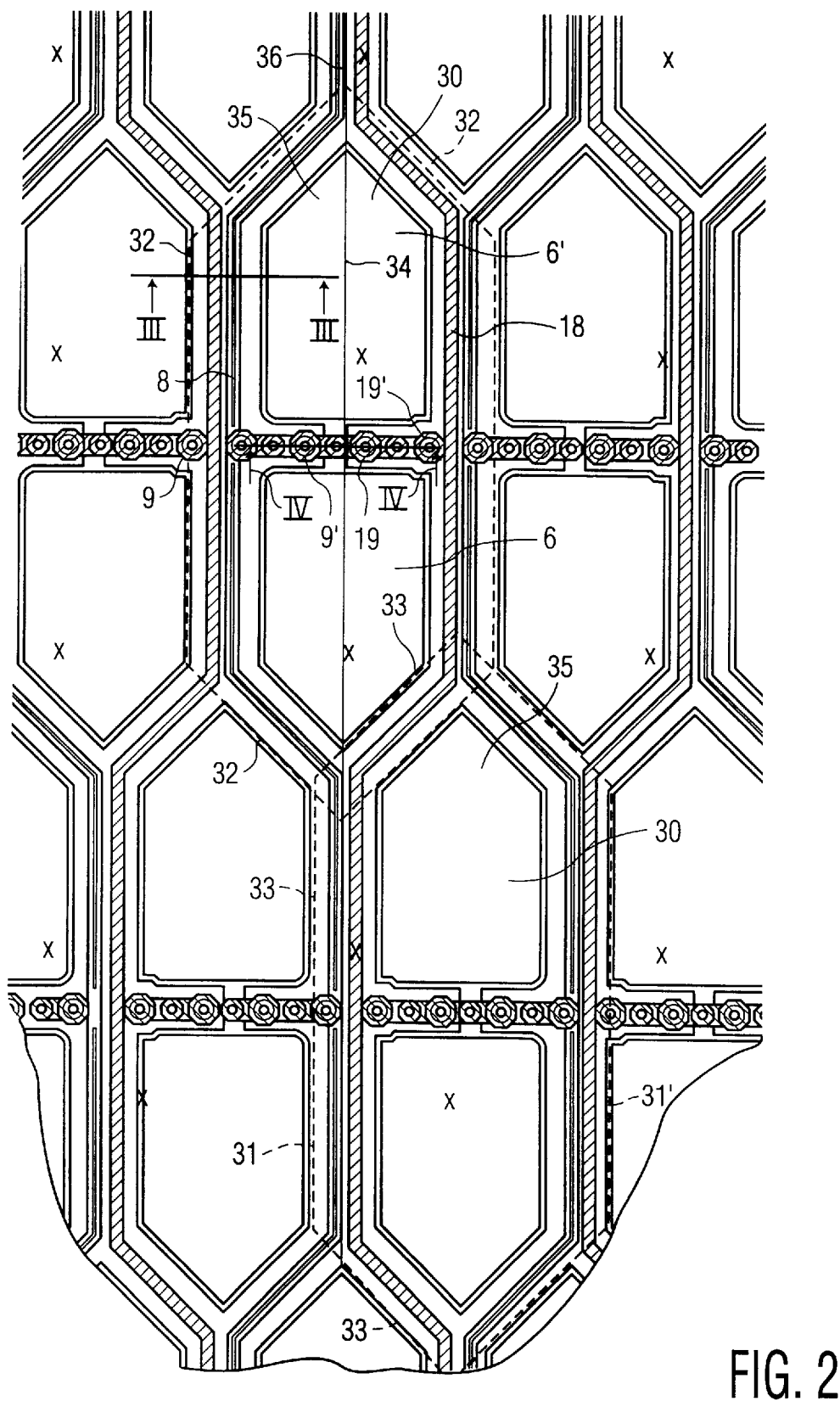
FIG. 2 is a diagrammatic plan view of a display device according to the invention.

FIGS. 2, 3 and 4 are diagrammatic plan views and cross-sections of a part of a display device according to the invention in which the layout has been optimized to prevent the occurrence of artifacts. The device is a liquid crystal display device 1 (FIG. 3) having two supporting plates 2 and 3 between which a twisted nematic liquid crystalline material 4 is present. The inner surfaces 24 of the supporting plates 2, 3 may be provided with chemically and electrically insulating layers 5. A number of picture electrodes 6 arranged in rows and columns and consisting of indium-tin oxide or another electrically conducting transparent material is arranged on the supporting plate 2. Transparent picture electrodes 7 of, for example indium-tin oxide which are integrated to strip-shaped row electrodes 11 are arranged on the other supporting plate 3. The facing picture electrodes 6, 7 constitute the pixels 12 of the display device. Liquid crystal orienting layers 10 are further provided on the inner surfaces of the supporting plates 2, 3. As is known, a different orientation of the liquid crystal molecules and thus an optically different state can be obtained by applying a voltage across the liquid crystal layer 4. The display device may be realised as a transmissive or as a reflective device and may have one or two polarizers.

In the relevant embodiment the picture electrodes 6 are connected in an electrically conducting manner to the column electrodes 8 via a switching unit, in this case comprising a series arrangement of two diodes 9, 9', said column electrodes being formed, for example from a double layer of indium-tin oxide 13 and chromium 14. The picture electrodes are connected to an auxiliary electrode 18, for example, a metal line via a switching unit comprising a series arrangement of two diodes 19, 19'. For reasons of redundancy, the switching units comprise two series-arranged diodes; if one of the diodes 9 or 19 is short-circuited, the switching function is maintained. Also for reasons of redundancy, the picture electrodes 6 are divided into sub-electrodes 6, 6' having equal surface areas so that one half still functions in the case of an open connection between the diodes 9, 19 and a sub-electrode.

According to the invention, the patterns of two picture electrodes located in successive rows with the associated switching elements, column and auxiliary electrodes of two pixels located in successive rows are offset with respect to each other by half a pitch (the distance between two lines through the centre of the pixels perpendicular to the row direction). Moreover, these two patterns, which are denoted by the reference numerals 32, 33 in FIG. 2, are situated mirror-symmetrically with respect to the direction transverse to the row direction, which is denoted by the line 34 in this embodiment. In this embodiment the patterns are hexagonal with a central part 30 whose sides 31, 31' are transverse to the row direction.

As a result thereof, and as there are always two electrodes (one column electrode and one electrode for the auxiliary electrode) between two picture electrodes, substantially no artifacts occur because the distances along which the column electrodes 8 extend along the picture electrodes 6 in different rows are now substantially equal so that the capacitive crosstalk between the column electrodes 8 and the picture electrodes 6 is substantially equal throughout. Since capacitive crosstalk differences no longer occur, the associated pixels also have a substantially identical electro-optical behaviour. An additional advantage of the device shown in FIG. 2 with the diodes 9, 19 between the sub-electrodes 6, 6' is that a black matrix which is realised perpendicularly to the surface of the substrates 2, 3 (usually on the substrate 3) outside the sub-electrodes 6, 6' has a smaller spatial frequency in the vertical direction than in the case where the diodes are arranged, for example, at the area of the non-central parts 35 (for example, at the vertices 36). This is notably advantageous when the spatial frequencies of the picture electrodes considerably differ in the horizontal and vertical directions. A further advantage is that the column electrodes 8 and the electrodes 18 do not have any sharp corners, which reduces the risk of short-circuits.

The device shown in FIGS. 2, 3, 4 may be manufactured as follows (see FIG. 4). The manufacturing method starts from a substrate 2 of, for example glass or quartz which is first provided with an electrically and chemically insulating layer 5. This layer is provided with a layer 13 of indium-tin oxide for the picture electrodes 6 and the column electrodes 8, which indium-tin oxide layer is in its turn coated with a layer of chromium 14 so as to reduce the resistance in the column electrodes. The double layer 13, 14 is subsequently patterned photolithographically.

For manufacturing the diodes 9, 19 the assembly thus obtained is provided with a layer 15 of (amorphous) silicon having a pin structure by doping the silicon with p-type impurities at the beginning (layer 16) and with n-type impurities at the end (layer 17) during deposition. Other diode structures (for example Schottky diodes) are alternatively possible. The diodes 9, 19 are obtained from the layer 15, 16, 17 by means of selective etching. The structure thus obtained is coated with a layer of electrically insulating material 20, for example silicon oxide or silicon nitride. Contact apertures 21 which do not only expose parts of the diodes 9, 19 but also the indium-tin oxide of the pixels 6 and the double layers 22 in FIG. 4 are formed in this layer 20 in the conventional manner.

The assembly is subsequently coated with a metal layer 23 in which a metal pattern is etched photolithographically. This pattern comprises, inter alia, the connections 25 between the diodes 9, 9' and 19 for interconnecting the diodes 9, 19, and the connection 25' between diode 19' and the electrode 18 for the reference voltage. The electrode 18 may also form part of this pattern but may alternatively be obtained in an extra step, as is shown diagrammatically in FIG. 4.

The structure thus obtained, which is coated with an orientation layer 10, constitutes a first plate of the display device 1. The second plate comprises, on a supporting plate 3, counter electrodes 7 in the form of row electrodes 11 and may also be provided with a colour filter. Moreover, said black matrix may be defined in this colour filter. The device may be further provided with polarizers, reflectors and an illumination source in generally known manner.

Figure 5:
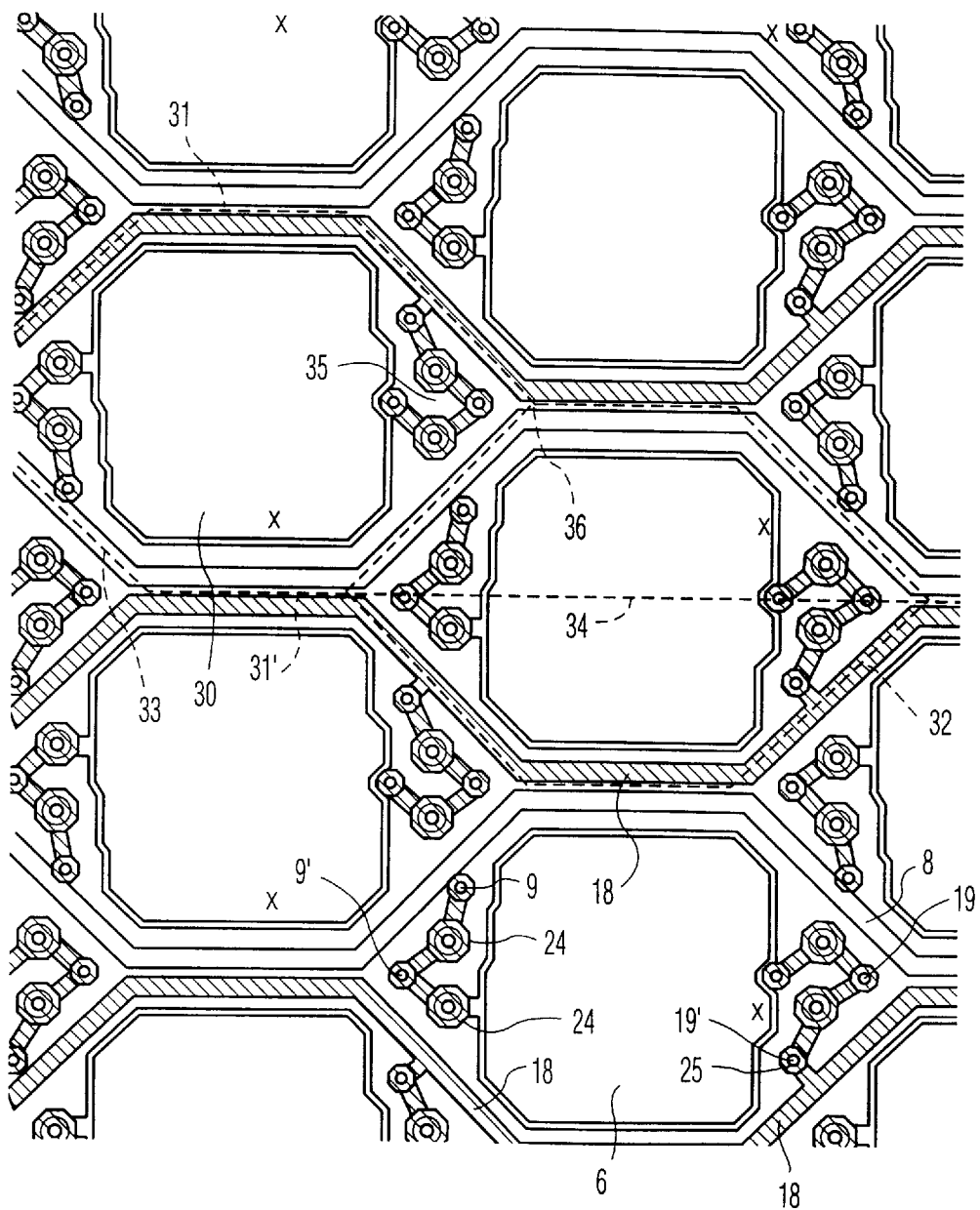
FIG. 5 is a plan view of a further display device according to the invention.

FIG. 5 is a plan view of a display device according to the invention, comprising repetitive patterns 32, 33 in which the picture electrodes are substantially rectangular and the diodes 9, 19 are realised in the non-central parts 35 at the vertices 36. Otherwise, the reference numerals denote components which are identical to those in FIG. 2.

The invention is of course not limited to the embodiments shown, but several variations are possible within the scope of the invention. For example, in FIG. 5 the picture electrodes may be divided into sub-electrodes and the diodes may be realised between these sub-electrodes; if necessary, the electrodes 8, 18 may then be right-angled. The diodes 9, 19 need not necessarily be redundant, while other forms of redundancy (parallel arrangement) are alternatively possible. Instead of diodes, other two-pole switching elements such as, for example MIMs or non-linear resistors may be used.

I claim:

1. A display device comprising an electro-optical display medium between two supporting plates, a system of pixels arranged in rows and columns, with each pixel being formed by picture electrodes arranged on the facing surfaces of the supporting plates, and a system of row and column electrodes for presenting selection and data signals, a picture electrode on one of the supporting plates being connected in an electrically conducting manner to a first switching unit between a column electrode for data signals and the picture electrode and to a second switching unit between the picture electrode and an electrode for a reference voltage, characterized in that the pixels in consecutive rows are offset with respect to each other in the row direction by a distance covering half a pitch, and in that the patterns of switching units, picture electrodes, column electrodes and electrodes for the reference voltage are arranged substantially mirror-symmetrically with respect to a direction transverse to the row direction for pixels associated with consecutive rows.

2. A display device as claimed in claim 1, characterized in that the pattern of switching units, picture electrodes, column electrodes and electrodes for the reference voltage is substantially hexagonal, with two sides of a central part of the hexagon being transverse to the row direction.

3. A display device as claimed in claim 2, characterized in that the switching elements are present outside the central part of the hexagon.

4. A display device as claimed in claim 1, characterized in that the picture electrodes comprise two sub-electrodes between which the switching elements are arranged.

5. A display device as claimed in claim 2, characterized in that the picture electrodes comprise two sub-electrodes between which the switching elements are arranged.

* * * * *